United States Patent
Koda et al.

(10) Patent No.: US 10,942,031 B2
(45) Date of Patent: Mar. 9, 2021

(54) INFORMATION PROCESSING DEVICE, MEASUREMENT DEVICE AND CONTROL METHOD

(71) Applicant: PIONEER CORPORATION, Tokyo (JP)

(72) Inventors: Takeshi Koda, Kawagoe (JP); Kenji Mito, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 161 days.

(21) Appl. No.: 16/308,776

(22) PCT Filed: Jun. 10, 2016

(86) PCT No.: PCT/JP2016/067365
§ 371 (c)(1),
(2) Date: Dec. 10, 2018

(87) PCT Pub. No.: WO2017/212639
PCT Pub. Date: Dec. 14, 2017

(65) Prior Publication Data
US 2019/0316915 A1    Oct. 17, 2019

(51) Int. Cl.
G01C 21/32 (2006.01)
G08G 1/0968 (2006.01)
G01C 21/00 (2006.01)

(52) U.S. Cl.
CPC ......... *G01C 21/32* (2013.01); *G01C 21/3848* (2020.08); *G08G 1/0968* (2013.01)

(58) Field of Classification Search
CPC ...... G01C 21/32; G01C 21/28; G08G 1/0968; G08G 1/0112; G08G 1/0129; G08G 1/0141; G08G 1/04; G09B 29/00; G09B 29/10
See application file for complete search history.

(56) References Cited

U.S. PATENT DOCUMENTS 9,672,734 B1* 6/2017 Ratnasingam ....... G08G 1/0145
2010/0042314 A1* 2/2010 Vogt ................... G01C 21/3484
701/532

(Continued)

FOREIGN PATENT DOCUMENTS

JP  2007-101580 A  4/2007
JP  2009-264983 A  11/2009

(Continued)

OTHER PUBLICATIONS

International Search Report for related International Application No. PCT/JP2016/067365 dated Sep. 20, 2016; English translation provided.

*Primary Examiner* — Marthe Y Marc-Coleman
(74) *Attorney, Agent, or Firm* — Procopio, Cory, Hargreaves & Savitch LLP

(57) ABSTRACT

A server device 4 stores on a storage unit 42 an advanced map database 43 which includes feature information associated with a feature. The server device 4 receives, from vehicle mounted devices 1 equipped with external sensors 31 which measure features, difference information Idf indicative of a difference between feature information and the actual feature corresponding to the feature information. In accordance with the degree of reliability Rdf which is calculated based on a plurality of the difference information Idf, the server device 4 sends to the vehicle mounted device 1 a raw data request signal SR for requesting the transmission of raw data which is measurement data of the actual feature.

10 Claims, 8 Drawing Sheets

(56) References Cited

U.S. PATENT DOCUMENTS

| | | | |
|---|---|---|---|
| 2010/0075523 A1* | 3/2010 | Saitou | H01R 13/5205 |
| | | | 439/273 |
| 2010/0121886 A1 | 5/2010 | Koshiba et al. | |
| 2016/0153792 A1* | 6/2016 | Schulz | G01C 21/34 |
| | | | 701/461 |
| 2020/0034351 A1* | 1/2020 | Matsugatani | G05D 1/0088 |

FOREIGN PATENT DOCUMENTS

| | | |
|---|---|---|
| JP | 2013-108820 A | 6/2013 |
| JP | 2014-085184 A | 5/2014 |
| JP | 2014-228526 A | 12/2014 |
| JP | 2016-048226 A | 4/2016 |

* cited by examiner

FIG. 4

Idf: DIFFERENCE INFORMATION

| | |
|---|---|
| HEADER INFORMATION | HEADER ID |
| | VERSION INFORMATION |
| | TIME INFORMATION IN DETECTING DIFFERENCE |
| | OWN VEHICLE POSITION INFORMATION IN DETECTING DIFFERENCE |
| | OWN VEHICLE POSTURE INFORMATION IN DETECTING DIFFERENCE |
| BODY INFORMATION | FEATURE ID |
| | CHANGE INDICATIVE FLAG |
| | SENSOR TYPE INFORMATION |
| | ・・・ |

FIG. 5

SR: RAW DATA REQUEST SIGNAL

| HEADER INFORMATION | HEADER ID | | |
|---|---|---|---|
| | VERSION INFORMATION | | |
| | ... | | |
| BODY INFORMATION | POSITION INFORMATION ( + FEATURE ID) | | |
| | RAW DATA TRANSMISSION CONDITIONS | OWN VEHICLE POSITION CONDITION | |
| | | TRAVELLING SPEED CONDITION | |
| | | TIME ZONE CONDITION | |
| | | SENSOR CONDITIONS | SENSOR TYPE CONDITION |
| | | | SENSOR DATA CONDITION |

FIG. 6

Irw: RAW DATA INFORMATION

| HEADER INFORMATION | HEADER ID |
| --- | --- |
| | VERSION INFORMATION |
| | TIME INFORMATION IN ACQUIRING RAW DATA |
| | OWN VEHICLE POSITION INFORMATION IN ACQUIRING RAW DATA |
| | OWN VEHICLE POSTURE INFORMATION IN ACQUIRING RAW DATA |
| BODY INFORMATION | TYPE ID OF RAW DATA |
| | RAW DATA SIZE |
| | RAW DATA |

FIG. 8A

| HEADER INFORMATION | HEADER ID | |
|---|---|---|
| | VERSION INFORMATION | |
| | . . . | |
| BODY INFORMATION | FEATURE ID | |
| | POSITION INFORMATION | |
| | ATTRIBUTE INFORMATION | DEGREE OF RELIABILITY |
| | | . . . |

FIG. 8B

| HEADER INFORMATION | HEADER ID |
|---|---|
| | VERSION INFORMATION |
| | LINK ID / NODE ID |
| BODY INFORMATION | POSITION INFORMATION FORMAT INFORMATION |
| | SIZE INFORMATION |
| | POSITION INFORMATION #1 |
| | POSITION INFORMATION #2 |
| | POSITION INFORMATION #3 |
| | ... |
| | POSITION INFORMATION #N |

INFORMATION PROCESSING DEVICE, MEASUREMENT DEVICE AND CONTROL METHOD

CROSS-REFERENCE TO RELATED APPLICATIONS

This application is a U.S. National Stage entry of PCT Application No: PCT/JP2016/067365 filed Jun. 10, 2016, the contents of which are incorporated herein by reference.

TECHNICAL FIELD

The present invention relates to a technology for updating map data.

BACKGROUND TECHNIQUE

There is known a method of updating map data based on the output of a sensor mounted on a vehicle. For example, Patent Reference-1 discloses a navigation system which includes a server configured to store and manage the latest map data and a navigation device configured to receive map update information from the server. According to Patent Reference-1, when detecting a change in the map data by sensor, the above navigation device changes the configuration to raise the frequency of the map update request regarding the position where the change is detected.

Patent Reference-1: Japanese Patent Application Laid-open under No. 2013-108820

DISCLOSURE OF INVENTION

Problem to be Solved by the Invention

There is known such a map data update system that each vehicle detects a changing point in map data by sensor and sends the data associated with the changing point to a server which stores and manages the map data. In such a system, at the time of receiving the same or similar data associated with a changing point a number of times equal to or larger than a predetermined number of times, the server determines that the changing point is reliable to reflect the data associated with the changing point to the map data. In contrast, in cases that the reliability of the change is a medium degree (i.e., cases that whether or not the change occurs cannot be concluded), there is a possibility of missing opportunities to reflect the change to the map data even though the change actually occurs or a possibility of mistakenly reflecting the change to the map data even though there is actually no change. In contrast, for an advanced map which is used for autonomous driving, it is necessary to surely and correctly update the map if there is any change in the map. The above issues are not disclosed in Patent Reference-1.

The above is an example of issues to be solved by the present invention. An object of the present invention is to provide an information processing device and a measurement device capable of surely and correctly updating a map.

Means for Solving the Problem

One invention is an information processing device including: a storage unit configured to store feature information associated with a feature; a receiving unit configured to receive, from moving bodies equipped with measurement devices which measure features, difference information indicative of a difference between the feature information and the real feature corresponding to the feature information; and a request unit configured to request, on a basis of degree of reliability calculated based on the difference information, the moving bodies or another moving body to send measurement data of the real feature.

Another invention is a measurement device mounted on a moving body, the measurement device including: a measurement unit configured to measure a position of an object situated around the moving body; a storage unit configured to sequentially store measurement data generated by the measurement unit; a receiving unit configured to receive, from an external device which includes a storage device configured to store feature information associated with a feature, a transmission request including position information associated with the feature; and a transmission unit configured to send to the external device the measurement data stored on the storage unit in cases that a distance between a position of the moving body and a position indicated by the transmission request is equal to or shorter than a predetermined distance.

Still another invention is a control method executed by an information processing device equipped with a storage unit configured to store feature information associated with a feature, the control method including: a receiving process to receive, from moving bodies equipped with measurement devices which measure features, difference information indicative of a difference between the feature information and the real feature corresponding to the feature information; and a request process to request, on a basis of degree of reliability calculated based on the difference information, the moving bodies or another moving body to send measurement data of the real feature.

Still another invention is a control method executed by a measurement device mounted on a moving body, the measurement device including a measurement unit configured to measure a position of an object situated around the moving body; the control method including: a storage process to sequentially store measurement data generated by the measurement unit on a storage unit; a receiving process to receive, from an external device which includes a storage device configured to store feature information associated with a feature, a transmission request including position information associated with the feature; and a transmission process to send to the external device the measurement data stored on the storage unit in cases that a distance between a position of the moving body and a position indicated by the transmission request is equal to or shorter than a predetermined distance.

BRIEF DESCRIPTION OF THE DRAWINGS

FIG. 4 is an example of the data structure of difference information.

FIG. 5 is an example of a data structure of a raw data request signal.

FIG. 6 is an example of a data structure of raw data information.

FIGS. 8A and 8B illustrate one or more data structures that include a raw data request.

DETAILED DESCRIPTION OF THE PREFERRED EMBODIMENTS

Figure 1:
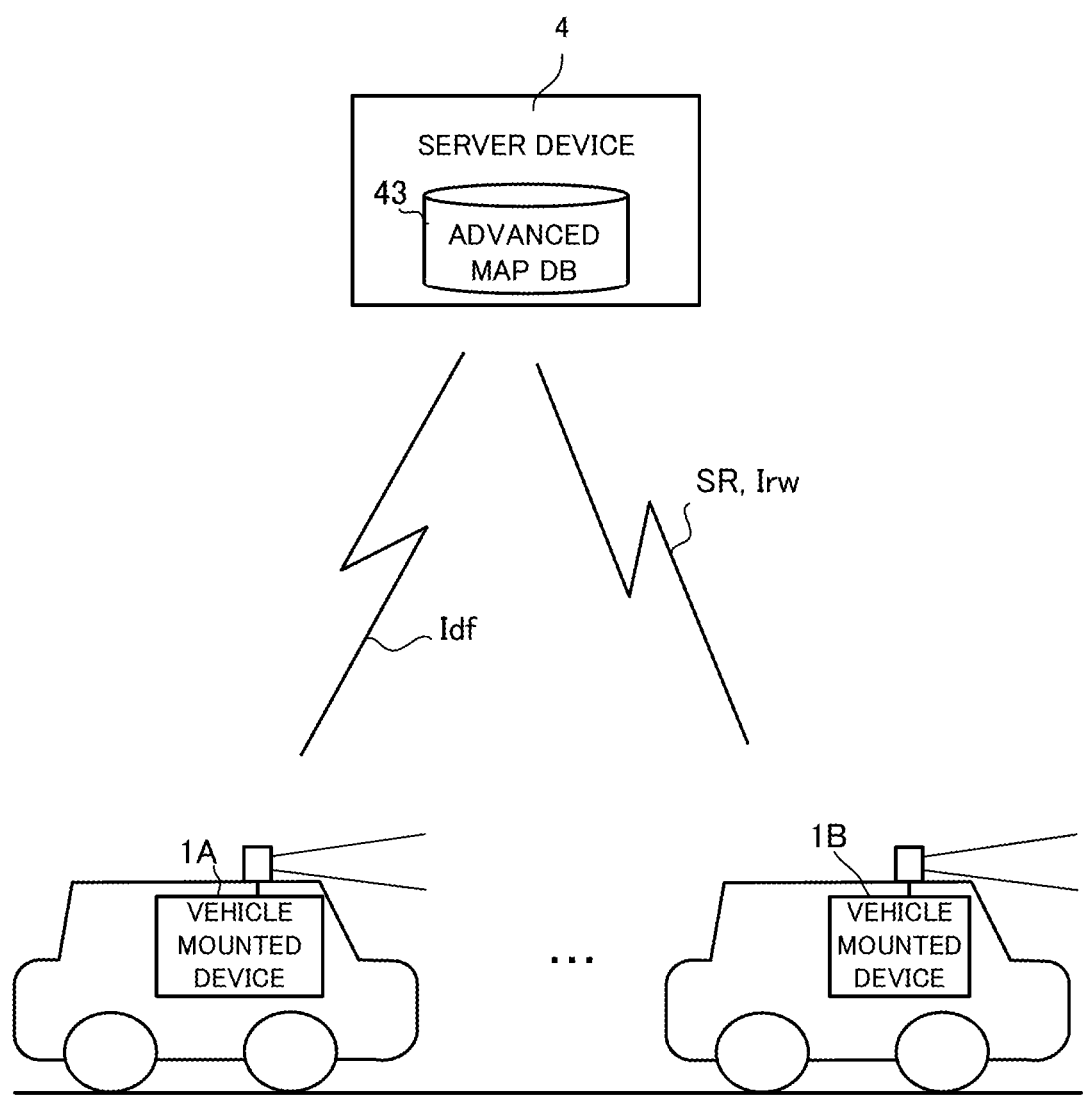
FIG. 1 illustrates a schematic configuration of an advanced map system.

According to a preferable embodiment of the present invention, there is provided an information processing device including: a storage unit configured to store feature information associated with a feature; a receiving unit configured to receive, from moving bodies equipped with measurement devices which measure features, difference information indicative of a difference between the feature information and the real feature corresponding to the feature information; and a request unit configured to request, on a basis of degree of reliability calculated based on the difference information, the moving bodies or another moving body to send measurement data of the real feature.

The above information processing device includes a storage unit, a receiving unit and a request unit. The storage unit stores feature information associated with a feature. The receiving unit receives, from moving bodies equipped with measurement device which measure feature, difference information indicative of a difference between the feature information and the real feature corresponding to the feature information. The request unit requests, on a basis of degree of reliability calculated based on the difference information, the moving bodies or another moving body to send measurement data of the real feature. According to this mode, for a feature in which there might be a change according to the difference information, the information processing device acquires and analyzes the measurement data of the target feature from moving bodies to thereby correctly determine the presence/absence of the change in the feature.

In one mode of the information processing device, a volume of the measurement data is larger than a volume of the difference information. According to this mode, the information processing device can correctly determine the presence/absence of the change in the feature while suitably suppressing the increase of the communication volume due to the exchange of unnecessary measurement data.

In another mode of the information processing device, the information processing device further includes an update unit configured to update the feature information in cases that the degree of the reliability exceeds an upper limit value while not updating the feature information in cases that the degree of the reliability is lower than a lower limit value, wherein the request unit requests the moving bodies or the another moving body to send the measurement data in cases that the degree of the reliability does not exceed the upper limit value and equal to or higher than the lower limit value. According to this mode, while suitably suppressing the increase of the communication volume due to the exchange of unnecessary measurement data, the information processing device can correctly determine the presence/absence of the change in the feature based on the measurement data even in cases that the presence/absence of the change in the feature cannot be correctly determined only based on the difference information.

In another mode of the information processing device, the request unit requests the moving bodies or the another moving body to send the measurement data in cases that the receiving unit does not receive the difference information a number of times necessary to calculate the degree of the reliability during a predetermined period. According to this mode, the information processing device can correctly determine the presence/absence of the change in the feature based on the measurement data even in cases that the presence/absence of the change in the feature cannot be correctly determined due to the shortage of the number of the difference information.

In another mode of the information processing device, the measurement data is three-dimensional data generated by ranging device(s) which emit laser beams. According to this mode, the information processing device can correctly determine the presence/absence of the change in the feature based on the measurement data.

According to still another preferable embodiment of the present invention, there is provided a measurement device mounted on a moving body, the measurement device including: a measurement unit configured to measure a position of an object situated around the moving body; a storage unit configured to sequentially store measurement data generated by the measurement unit; a receiving unit configured to receive, from an external device which includes a storage device configured to store feature information associated with a feature, a transmission request including position information associated with the feature; and a transmission unit configured to send to the external device the measurement data stored on the storage unit in cases that a distance between a position of the moving body and a position indicated by the transmission request is equal to or shorter than a predetermined distance. According to this mode, at the time of receiving a transmission request which includes position information associated with a feature from an external device which stores feature information, the measurement device can send the measurement data corresponding to the target feature so that the external device suitably executes analyses on the change of the feature information.

In one mode of the measurement device, the storage unit updates the measurement data in cases that the position of the moving body changes. According to this mode, the measurement device can suitably suppress the storage unit from redundantly storing measurement data measured at the same position.

In another mode of the measurement device, the storage unit stores a plurality of the measurement data corresponding to a plurality of different positions of the moving body, wherein in cases that the position of the moving body changes, the storage unit deletes longest-stored measurement data out of the plurality of the measurement data while storing measurement data newly generated by the measurement unit. According to this mode, the measurement device can store on the storage unit measurement data generated at the time of moving a latest predetermined distance.

According to another preferable embodiment of the present invention, there is provided a control method executed by an information processing device equipped with a storage unit configured to store feature information associated with a feature, the control method including: a receiving process to receive, from moving bodies equipped with measurement devices which measure features, difference information indicative of a difference between the feature information and the real feature corresponding to the feature information; and a request process to request, on a basis of degree of reliability calculated based on the difference information, the moving bodies or another moving body to send measurement data of the real feature. By executing the control method, for a feature in which there might be a change according to the difference information, the information processing device acquires and analyzes the measurement data of the target feature from moving bodies to thereby correctly determine the presence/absence of the change in the feature.

According to another preferable embodiment of the present invention, there is provided a control method executed by a measurement device mounted on a moving body, the measurement device including a measurement unit configured to measure a position of an object situated around the moving body; the control method including: a storage process to sequentially store measurement data generated by the measurement unit on a storage unit; a receiving process to receive, from an external device which includes a storage device configured to store feature information associated with a feature, a transmission request including position information associated with the feature; and a transmission process to send to the external device the measurement data stored on the storage unit in cases that a distance between a position of the moving body and a position indicated by the transmission request is equal to or shorter than a predetermined distance. By executing the control method, at the time of receiving a transmission request which includes position information associated with a feature from an external device which stores feature information, the measurement device can send the measurement data corresponding to the target feature so that the external device suitably executes analyses on the change of the feature information.

In a preferable example, a program makes a computer function as any one of the above-mentioned information processing devices or measurement devices. By executing the program, the computer suitably functions as any one of the above-mentioned information processing devices or measurement devices.

EMBODIMENT

Now, a preferred embodiment of the present invention will be described below with reference to the attached drawings.

[System Configuration]

FIG. 1 illustrates a schematic configuration of an advanced map system according to the embodiment. The advanced map system includes vehicle mounted devices 1 (1A, 1B, . . . ) equipped with external sensors which measure features and a server device 4 which stores an advanced map DB 43. Then, the advance map system accurately updates information (referred to as "feature information") in the advanced map DB 43 associated with features situated around roads such as position information of the features and/or shape information of the features and the like.

A vehicle mounted device 1 includes one or more external sensors such as a LIDAR (Light Detection and Ranging, or Laser Illuminated Detection and Ranging) and a camera and estimates the own vehicle position with a high degree of accuracy based on the output of the external sensors.

The vehicle mounted device 1 according to the embodiment detects a difference from the feature information in the advanced map DB 43 based on the output of an external device, then sending to the server device 4 information (referred to as "difference information Idf") associated with the detected difference. In such a case that the vehicle mounted device 1 receives a signal (referred to as "raw data request signal SR") for requesting unprocessed data (so-called raw data) which the external sensor outputs, the vehicle mounted device 1 sends to the server device 4 information (referred to as "raw data information Irw") of raw data generated at the time when the target detection range includes the position specified by the raw data request signal SR. Hereinafter, for the purpose of explanation, the vehicle mounted device 1 which sends the difference information Idf is also referred to as "vehicle mounted device 1A" and the vehicle mounted device 1 which sends the raw data information Irw based on the raw data request signal SR is also referred to as "vehicle mounted device 1B". It is noted that the actual vehicle mounted device 1 mounted on each vehicle may have both of the functions of the vehicle mounted device 1A and the vehicle mounted device 1B. The vehicle mounted device 1 is an example of the "measurement device" according to the present invention.

The server device 4 stores the advanced map DB 43 which includes feature information corresponding to each feature situated on or around roads. The server device 4 sends a part of or the entire advanced map DB 43 in response to the request from the vehicle mounted device 1. Examples of features registered as the feature information in the advanced map DB 43 include not only periodically arranged features along a road such as a mile marker, a hundred-meter post, a delineator, a traffic infrastructure (e.g., a signage, a direction signboard and a traffic signal), a utility pole and a street lamp but also a natural feature such as a tree. According to the embodiment, on the basis of the difference information Idf received from the vehicle mounted devices 1A, the server device 4 determines whether or not there is any change in the feature information in the advanced map DB 43. In this case, the server device 4 calculates the degree of reliability (referred to as "degree of reliability Rdf") of the difference information Idf and then sends the raw data request signal SR to the vehicle mounted device 1 depending on the calculated degree of reliability Rdf. Then, at the time of receiving the raw data information Irw in response to the raw data request signal SR, the server device 4 analyzes the raw data included in the raw data information Irw to thereby determine the necessity of updating the feature information in the advanced map DB 43 and updated content thereof. The server device 4 is an example of the "information processing device" and the "external device" according to the present invention.

[Configuration of Vehicle Mounted Device and Server Device]

Figure 2A:
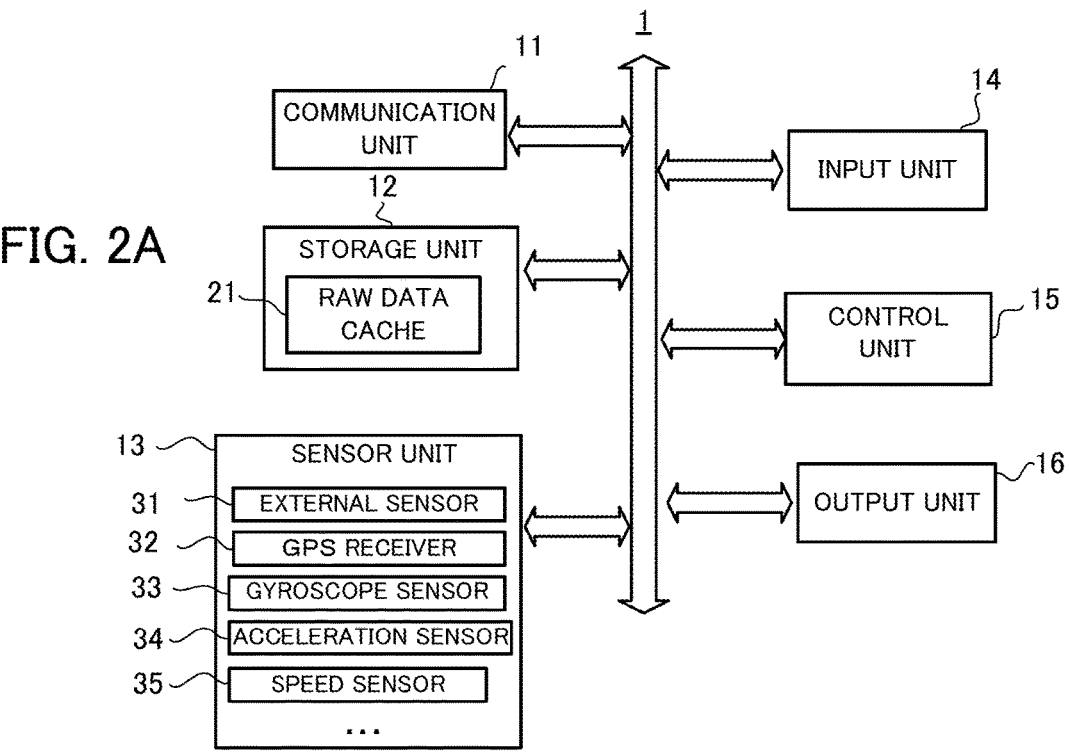
FIG. 2A illustrates a functional configuration of a vehicle mounted device.

FIG. 2A is a block diagram illustrating a functional configuration of the vehicle mounted device 1. The vehicle mounted device 1 mainly includes a communication unit 11, a storage unit 12, a sensor unit 13, an input unit 14, a control unit 15 and an output unit 16. These elements are connected to each other via a bus line.

Under the control of the control unit 15, the communication unit 11 exchanges data such as the difference information Idf, the raw data request signal SR and the raw data information Irw with the server device 4. The communication unit 11 receives map data which includes feature information under the control of the control unit 15.

The storage unit 12 stores a program to be executed by the control unit 15 and information necessary for the control unit 15 to execute a predetermined processing. For example, the storage unit stores the map data which includes the feature information received from the server device 4.

According to the embodiment, the storage unit 12 of the vehicle mounted device 1B stores raw data on a raw data cache 21 for temporarily storing the raw data generated on the most-recently traveling section with a predetermined distance. As is mentioned later, every time the vehicle travels a predetermined distance, the control unit 15 stores the latest raw data generated by the external sensors 31 on the raw data cache 21 in such a state that the raw data is associated with the time of acquisition of the raw data, the own vehicle position at the above time and the own vehicle posture at the above time. In this case, the control unit 15 may also store, on the raw data cache 21, information indicative of the position, the type and the configuration of the external sensor 31 which was used for the generation of the raw data. In this case, according to the first-in first-out method, the raw data cache 21 newly stores the latest raw data while deleting the raw data stored for the longest period. In this way, by storing the raw data in accordance with the travelling distance instead of storing the raw data in accordance with time, the control unit 15 can suitably suppress the raw data generated at the same position during a stop of the vehicle from being redundantly stored on the raw data cache 21.

The sensor unit 13 includes one or more external sensors 31 which measure a feature situated around the vehicle, a GPS receiver 32, a gyroscope sensor 33, an acceleration sensor 34 and a speed sensor 35. An external sensor 31 such as a camera and a LIDAR measures a feature situated around the vehicle to thereby output the measurement data to the control unit 15. For example, the LIDAR discretely measures distance to an external object by emitting pulse laser beams within a predetermined angle range (angle of field) with respect to the horizontal direction and the vertical direction to thereby generate three-dimensional point cloud information indicative of the position of the external object as the measurement data. The camera regularly captures image data to output the image data to the control unit 15. The external sensor 31 is an example of the "measurement unit" according to the present invention.

Examples of the input unit 14 include a button, a touch panel, a remote controller and an audio input device for user operations. The output unit 16 includes a display and/or a speaker which output under the control of the control unit 15.

The control unit 15 includes a CPU for executing programs and controls the entire vehicle mounted device 1. The control unit 15 predicts the own vehicle position based on the output of the GPS receiver 32 and the like and sends, to the server device 4 through the communication unit 11, a request signal in which the own vehicle position is specified. Accordingly, the control unit 15 receives, from the server device 4, the map data including the feature information relating to the vicinity of the own vehicle position to thereby store the map data on the storage unit 13. Additionally, through the communication unit 11, the control unit 15 performs a transmission process of the difference information Idf, a receiving process of the raw data request signal SR and a transmission process of the raw data information Irw and functions as the "receiving unit" and the "transmission unit" according to the present invention.

Figure 2B:
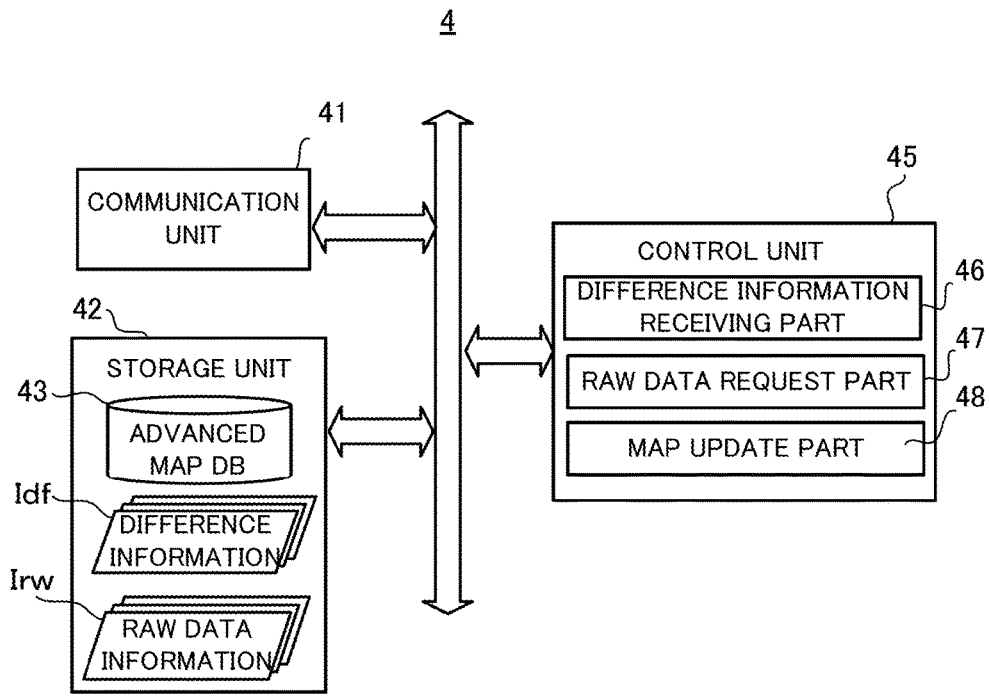
FIG. 2B illustrates a functional configuration of a server device.

FIG. 2B is a block diagram illustrating a functional configuration of the server device 4. The server device 4 mainly includes a communication unit 41 which exchanges data with the vehicle mounted devices 1 under the control of the control unit 45, a storage unit 42 and a control unit 45. These elements are connected to each other via a bus line.

The storage unit 42 stores a program to be executed by the control unit 45 and information necessary for the control unit 45 to execute a predetermined processing. According to the embodiment, the storage unit 42 stores the advanced map DB 43. The advanced map DB 43 includes the feature information corresponding to each feature that is subject to detection by the external sensor 31 of the vehicle mounted device 1. As is mentioned later, the storage unit 42 stores the difference information Idf and the raw data information Irw received from multiple vehicle mounted devices 1 under the control of the control unit 45.

The control unit 45 includes a CPU for executing programs and controls the entire server device 4. For example, in cases that the control unit 45 receives a request signal for requesting the map data through the communication unit 41, the control unit 45 extracts from the advanced map DB 43 the map data which includes the feature information relating to the vicinity of the position indicated by the position information that is included in the request signal. Then, the control unit 45 sends the map data to the requesting vehicle mounted device 1. Furthermore, the control unit 45 functionally includes a difference information receiving part 46, a raw data request part 47 and a map update part 48 to be mentioned later.

[Map Update Process]

Next, the detail of the update process of the advanced map DB 43 will be explained below.

(1) Functional Block

Figure 3:
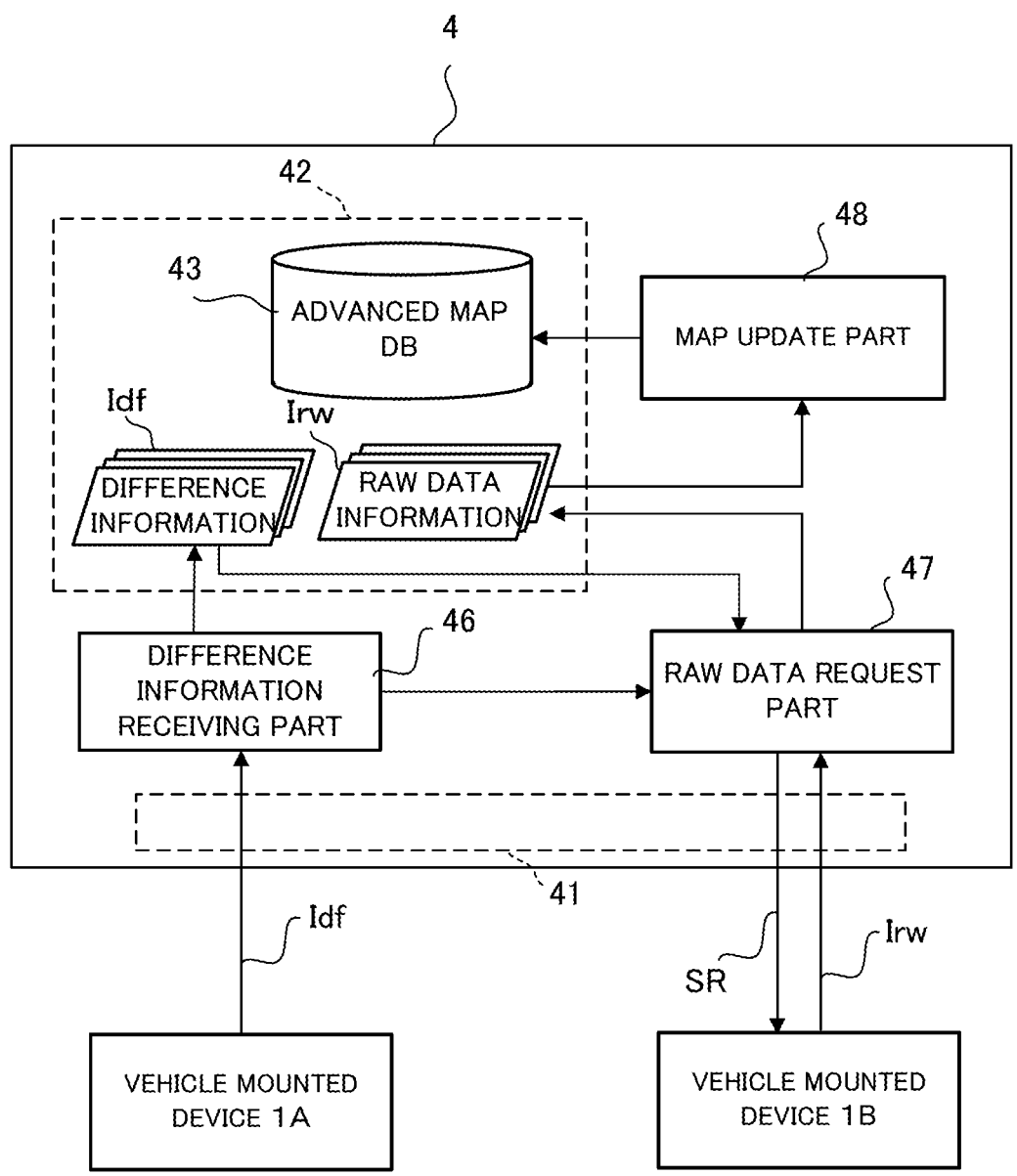
FIG. 3 is a functional block diagram illustrating the functional relationship among the vehicle mounted device and the server device.

FIG. 3 is a functional block diagram illustrating the functional relationship among the vehicle mounted devices 1 (1A and 1B) and each element of the server device 4.

Through the communication unit 41, the difference information receiving part 46 receives the difference information Idf indicative of the change from the vehicle mounted device 1A which detects a change (variation) of a feature whose feature information is registered in the advanced map DB 43. The difference information Idf does not include measurement data of the feature and the volume of the difference information Idf is smaller than the volume of the raw data information Irw. The difference information Idf includes identification information (referred to as "feature ID") of the feature and therefore the feature indicated by the difference information Idf can be identified thereby. The difference information receiving part 46 is an example of the "receiving unit" according to the present invention. It is noted that the vehicle mounted device 1A may send to the difference information receiving part 46 the difference information Idf indicative of the detection result of the feature based on the output of the external sensor 31 regardless of whether or not a change of the feature is detected. In this case, the difference information Idf includes information indicative of whether or not a difference (change) of the target feature is detected.

The raw data request part 47 calculates the degree of reliability Rdf based on the difference information Idf stored on the storage unit 42 with respect to each feature. In this case, for example, with respect to each feature, the raw data request part 47 estimates the total number of times the detection processes are performed. Then, the raw data request part 47 calculates the degree of reliability Rdf based on the ratio of the number of the difference information Idf indicative of a disappearance or an alteration of the feature to the total number. In this case, the raw data request part 47 may calculate the above total number by counting vehicle mounted devices 1 which pass a route (road or line) where the target feature can be detected with reference to the position information regularly sent from each vehicle mounted device 1. Instead, the raw data request part 47 may estimate the above total number by referring to statistical amount of traffic on the above route. In another example, if the difference information Idf is also sent at the time when there is no change in the feature, the raw data request part 47 may calculate the above total number by counting the received difference information Idf. In still another example, the raw data request part 47 may calculate the degree of reliability Rdf by only using the number of the difference information Idf indicative of a disappearance or an alteration of the feature. In still another example, with reference to information, included in the received difference information Idf, on the type of the external sensor 31 used in the feature detection process or information, included in the received difference information Idf, on the type of the vehicle, the raw data request part 47 may calculate the degree of reliability Rdf by weighting the difference information Idf, which is detected by a specified type of vehicles or by a specified type of external sensors 31, or only based on the difference information Idf, which is detected by the specified type of vehicles or by the specified type of external sensors 31.

In such a case that the raw data request part 47 recognizes, on the basis of the calculated degree of reliability Rdf, the necessity of analyzing the raw data information Irw and determining whether or not there is any change in the feature information, the raw data request part 47 sends the raw data request signal SR to the vehicle mounted device 1B. In this case, as described later, the raw data request signal SR includes position information of the target feature of detection. In this case, for example, the raw data request part 47 sends the raw data request signal SR to such a vehicle mounted device 1B that it is situated within a predetermined distance from the position where the target feature of the raw data information Irw exists. It is noted that the raw data request part 47 identifies the position of each of the vehicle mounted devices 1, for example, by regularly receiving the position information from each of the vehicle mounted devices 1 which travel on roads.

A supplemental explanation will be given of when to send the raw data request signal SR along with specific examples.

For example, if the degree of reliability Rdf is equal to or smaller than a predetermined upper limit threshold (referred to as "first threshold") and that the degree of reliability Rdf is equal to or larger than a predetermined lower limit threshold (referred to as "second threshold"), the raw data request part 47 determines that it should make a determination on whether or not there is any change in the feature information, therefore sending the raw data request signal SR. For example, the above first threshold is a threshold for determining whether or not to conclude that the difference information Idf is reliable whereas the above second threshold is a threshold for determining whether or not to conclude that the difference information Idf is unreliable. The first threshold is an example of the "upper limit value" according to the present invention and the second threshold is an example of the "lower limit value" according to the present invention.

In another example, in cases that there is such a feature that the feature information thereof is registered in the advanced map DB 43 and that the number of the corresponding difference information Idf gathered during a predetermined period is less than the required number which is necessary to calculate the degree of reliability Rdf, the raw data request part 47 sends the raw data request signal SR in which the position of the feature is specified. In still another example, in cases that the raw data request part 47 receives from the vehicle mounted device 1 information to notify the raw data request part 47 that the vehicle mounted device 1 has detected the difference between a road according to the map data and the actual detected road, the raw data request part 47 sends the raw data request signal SR in which the position around the road is specified.

Then, through the communication unit 41, the raw data request part 47 receives from the vehicle mounted device 1B the raw data information Irw which includes the raw data corresponding to the target feature of measurement as a reply of the raw data request signal SR. Then, the raw data request part 47 stores the received raw data information Irw on the storage unit 42. The raw data request part 47 is an example of the "request unit" according to the present invention.

The map update part 48 updates the feature information in the advanced map DB 43 based on the raw data information Irw stored on the storage unit 42. For example, in cases that the storage unit 42 has received and stored the raw data information Irw more than predetermined times with respect to a certain feature, the map update part 48 determines whether or not there is any change in the above certain feature by analyzing the stored raw data information Irw. Then, if the map update part 48 determines, on the basis of the analysis result, that there is a disappearance of the target feature or an alternation of the shape and/or position of the target feature, the map update part 48 changes the feature information corresponding to the target feature in the advanced map DB 43 based on the analysis result. The map update part 48 is an example of the "update unit" according to the present invention.

Here, a supplemental explanation will be given of the process at the time when the vehicle mounted device 1B receives the raw data request signal SR.

For example, in cases that the target detection range of the external sensor 31 is provided in the front direction of the vehicle, at the time of approaching the position indicated by the position information included in the raw data request signal SR within a predetermined distance, the vehicle mounted device 1B extracts all or a part of the raw data stored on the raw data cache 21 to send it to the server device 4 as the raw data information Irw. The above-mentioned predetermined distance is set to a distance which is equal to or smaller than the detectable distance by the external sensor 31 and which is necessary and sufficient to detect the feature. In another example, in cases that the detection range by the external sensor 31 ranges the rear direction and/or the side direction of the vehicle, at the time of moving away by a distance equal to or larger than a predetermined distance from the position indicated by the position information included in the raw data request signal SR after passing through the position, the vehicle mounted device 1B extracts all or a part of the raw data stored on the raw data cache 21 to send it to the server device 4 as the raw data information Irw. The vehicle mounted device 1B may send the raw data information Irw as soon as the above-mentioned condition is satisfied or may send the raw data information Irw at any timing after the condition is satisfied, wherein the condition is satisfied when the vehicle mounted device 1B approaches the position indicated by the position information included in the raw data request signal SR within a predetermined distance or when the vehicle mounted device 1B moves away by a distance equal to or larger than a predetermined distance from the position after approaching it.

According to any of these examples, the vehicle mounted device 1B can suitably send to the server device 4 the raw data whose target range includes the feature situated at the position according to the raw data request signal SR. Furthermore, the vehicle mounted device 1B sends the raw data information Irw including the raw data that is stored on the raw data cache 21 and that is generated at multiple positions. Thereby, even when the target feature is not captured in the raw data information Irw due to occurrences of the temporal obstruction to the target feature by a stop vehicle, the vehicle mounted device 1B can suitably let the server device 4 statistically detect the position and the shape of the feature based on a plurality of the raw data.

(2) Data Structure

Next, specific examples of each data structure of the difference information Idf, the raw data request signal SR and the raw data information Irw will be described below.

(2-1) Difference Information

FIG. 4 is an example of the data structure of the difference information Idf generated by the vehicle mounted device 1A at the time of detecting a change in a feature. The feature information illustrated in FIG. 4 includes header information and body information.

The header information includes fields "HEADER ID", "VERSION INFORMATION", "TIME INFORMATION IN DETECTING DIFFERENCE", "OWN VEHICLE POSITION INFORMATION IN DETECTING DIFFERENCE" and "OWN VEHICLE POSTURE INFORMATION IN DETECTING DIFFERENCE". In the field "HEADER ID", identification information to identify the difference information Idf is registered. In the field "VERSION INFORMATION", the version of the data structure of the body information is registered. In the fields "TIME INFORMATION IN DETECTING DIFFERENCE", "OWN VEHICLE POSITION INFORMATION IN DETECTING DIFFERENCE" and "OWN VEHICLE POSTURE INFORMATION IN DETECTING DIFFERENCE", there are registered time information indicative of the time of detecting a change (i.e., difference) in the feature, position information at the time and posture information of the vehicle at the time, respectively. In this case, for example, on the basis of detection signals supplied from internal sensors such as the gyroscope sensor 33 and the acceleration sensor 34, the vehicle mounted device 1 calculates the roll angle, the pitch angle and the yaw angle of the vehicle at the time of detecting the feature to thereafter register information associated with these angles in the field "OWN VEHICLE POSTURE INFORMATION IN DETECTING DIFFERENCE".

The body information includes fields "FEATURE ID", "CHANGE INDICATIVE FLAG" and "SENSOR TYPE INFORMATION". In the field "FEATURE ID", the identification information of the feature that is allocated to the feature uniquely in the advanced map DB 43 is registered. The feature ID may have multiple IDs for identifying the feature in stages. For example, the feature ID of the "road sign A" may be configured of a first ID which identifies the category "road sign", a second ID which identifies the subcategory "A" in the category "road sign". In this case, these first ID and second ID may be registered in different fields.

In the field "CHANGE INDICATIVE FLAG", a flag which indicates that there is a change in the feature is registered. Examples of the content to be registered in the field "CHANGE INDICATIVE FLAG" include a flag which indicates that the target feature disappears, a flag which indicates that there is a change in the position of the target feature and a flag which indicates that there is a change in the shape of the target feature. In the field "SENSOR TYPE INFORMATION", information indicative of the type of the external sensor 31 used in the feature detection process is registered. It is noted that instead of or in addition to the field "SENSOR TYPE INFORMATION", the field "VEHICLE TYPE INFORMATION" which indicates the type of the vehicle may be provided.

As described above, since the difference information Idf does not have any field for registering data with high volume, the volume of the difference information Idf is lower than the volume of the raw data information Irw which includes the measurement data (raw data) generated by the external sensor 31.

(2-2) Raw Data Request Signal

FIG. 5 illustrates an example of the data structure of the raw data request signal SR. In FIG. 5, the raw data request signal SR includes fields "HEADER ID" and "VERSION INFORMATION" as header information while including fields "POSITION INFORMATION" and "RAW DATA TRANSMISSION CONDITIONS" as body information.

In the field "POSITION INFORMATION", information to identify the target location (i.e., the position of the target feature in which whether or not there is a change is to be determined) where the raw data information Irw is to be acquired. In some embodiments, in addition to the field "POSITION INFORMATION", there may be provided a field "FEATURE ID".

In the field "RAW DATA TRANSMISSION CONDITIONS", information indicative of conditions in acquiring the raw data information Irw is registered. The field "RAW DATA TRANSMISSION CONDITIONS" includes subfields "OWN VEHICLE POSITION CONDITION", "TRAVELLING SPEED CONDITION", "TIME ZONE CONDITION" and "SENSOR CONDITION". In the subfield "OWN VEHICLE POSITION CONDITION", the condition associated with the position of the vehicle in acquiring the raw data information Irw is registered. For example, the lane number indicative of the lane where the raw data information Irw is to be acquired and the posture of the vehicle at the time when the raw data information Irw is to be acquired are registered in the subfield. In the subfield "TRAVELLING SPEED CONDITION", the condition (e.g., equal to or lower than x ("x" is positive number) km/h) of the vehicle speed in acquiring the raw data information Irw is registered. In the subfield "TIME ZONE CONDITION", the condition of the time zone in acquiring the raw data information Irw is registered.

In the subfield "SENSOR CONDITIONS", conditions associated with the external sensor 31 which generates raw data to be included in the raw data information Irw are registered. The subfield "SENSOR CONDITIONS" has two subfields "SENSOR TYPE CONDITION" and "SENSOR DATA CONDITION". In the subfield "SENSOR TYPE CONDITION", information which specifies the type (e.g., a LIDAR or a camera) of the external sensor 31 to generate the raw data information Irw is registered. In the subfield "SENSOR DATA CONDITION", there is registered condition of the configuration(setting) to be applied to the external sensor 31 specified by the subfield "SENSOR TYPE CONDITION" at the time of generating the raw data. For a LIDAR, examples of the content registered in the subfield "SENSOR DATA CONDITION" include instructions that only point cloud information of object(s) which is y (y is a positive number) meters or more away should be sent as the raw data and instructions that only point cloud information having a luminance equal to or higher than a predetermined value should be sent as the raw data. The subfield "SENSOR CONDITION" may additionally have a subfield for specifying the positional condition of the external sensor 31 to be used for generation of the raw data with respect to the vehicle on the assumption that the external sensors 31 of the vehicle mounted device 1 are provided at multiple positions of the vehicle. In this way, in the subfield "SENSOR CONDITIONS", there is registered information which specifies the external sensor 31 to generate the raw data and the condition of the configuration thereof.

It is noted that in the body information, there may also be provided another field such as a field "RAW DATA TRANSMISSION REQUEST FLAG" for storing flag information (e.g., "1" for necessity and "0" for unnecessity) indicative of the necessity/unnecessity of the raw data information Irw.

(2-3) Raw Data Information

FIG. 6 illustrates an example of the data structure of the raw data information Irw generated by the vehicle mounted device 1B which receives the raw data request signal SR. The feature information illustrated in FIG. 6 includes header information and body information.

The header information includes fields "HEADER ID", "VERSION INFORMATION", "TIME INFORMATION IN ACQUIRING RAW DATA", "OWN VEHICLE POSITION INFORMATION IN ACQUIRING RAW DATA" and "OWN VEHICLE POSTURE INFORMATION IN ACQUIRING RAW DATA". In the field "HEADER ID", identification information to identify the raw data information Irw is registered. In the field "VERSION INFORMATION", information indicative of the version of the data structure of the body information is registered. In the subfields "TIME INFORMATION IN ACQUIRING RAW DATA", "OWN VEHICLE POSITION INFORMATION IN ACQUIRING RAW DATA" and "OWN VEHICLE POSTURE INFORMATION IN ACQUIRING RAW DATA", information indicative of the time when the raw data included in the body information is generated, information indicative of the position at the time and information indicative of the posture of the vehicle at the time are registered, respectively.

The body information includes fields "TYPE ID OF RAW DATA", "RAW DATA SIZE" and "RAW DATA". In the field "TYPE ID OF RAW DATA", identification information indicative of the type of the raw data or identification information indicative of the type of the external sensor 31 which outputs the raw data is registered. In the field "RAW DATA SIZE", the size information of the raw data in the field "RAW DATA" is registered. In the field "RAW DATA", the raw data extracted from the raw data cache 21 is registered.

(3) Process Flow

Figure 7:
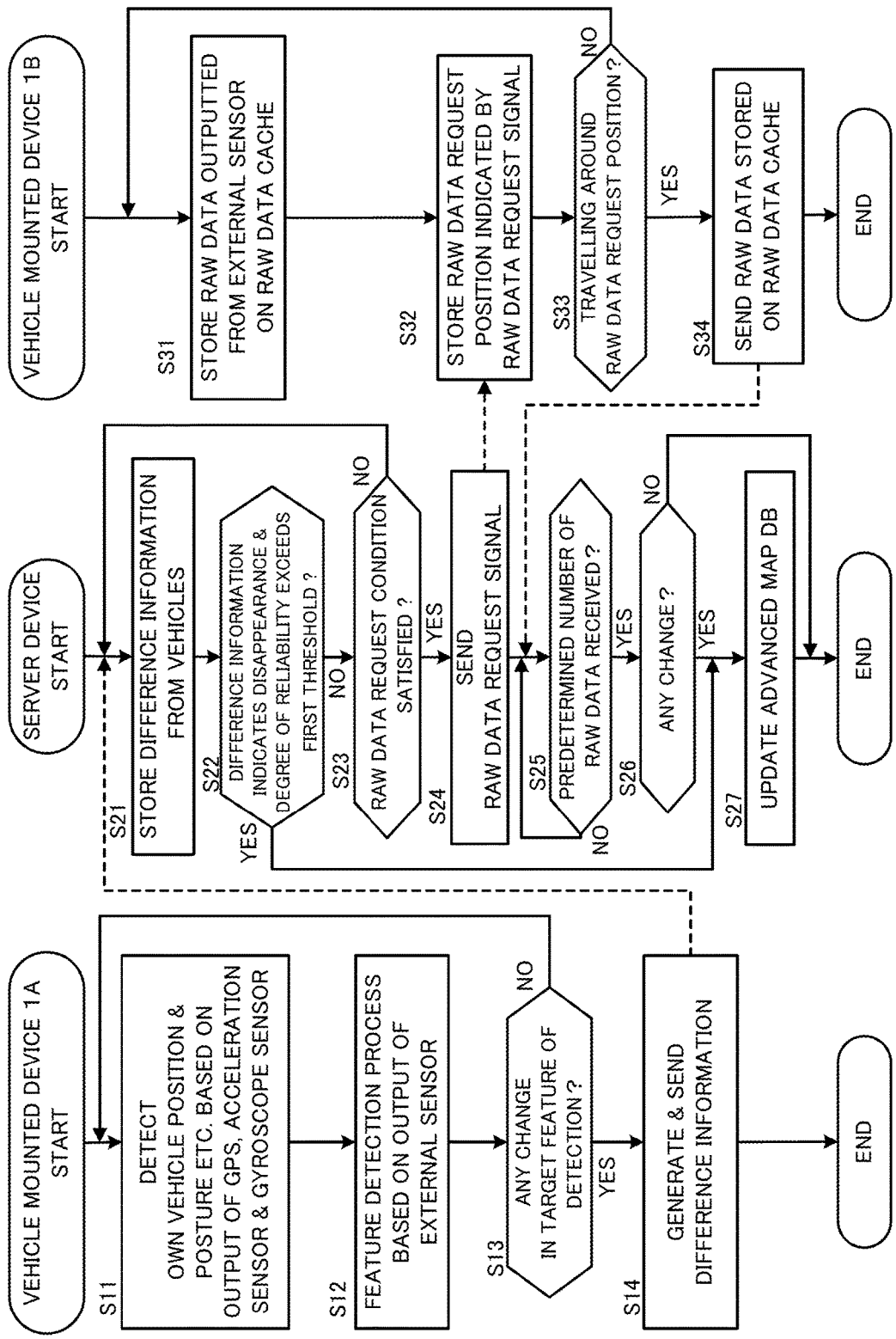
FIG. 7 illustrates an example of a flowchart indicative of the procedure of the process according to an embodiment.

FIG. 7 is a flowchart indicative of each procedure of the processes executed by the vehicle mounted device 1A which generates the difference information Idf, the server device 4 and the vehicle mounted device 1B which receives the raw data request signal SR from the server device 4 to generate the raw data information Irw. The vehicle mounted device 1A, the server device 4 and the vehicle mounted device 1B repeatedly execute the processes of the flowchart in FIG. 7.

First, the vehicle mounted device 1A detects the present position of the vehicle, the present posture thereof, and the present speed thereof based on the output of the GPS receiver 32, the gyroscope sensor 33, the acceleration sensor 34 and the speed sensor 35 (step S11).

Next, the vehicle mounted device 1A performs the feature detection process based on the output of the external sensor 31 (step S12). In this case, for example, on the basis of the feature information stored on the storage unit 12, the vehicle mounted device 1A identifies a feature situated around the present position predicted at step S11. Then, the vehicle mounted device 1A detects the feature based on the output of the external sensor 3l. In this case, for example, by regularly receiving from the server device 4 the map data which includes the feature information in the vicinity of the own vehicle position, the vehicle mounted device 1A stores on the storage unit 12 the feature information whose content is the same as the feature information registered in the advanced map DB 43.

Then, the vehicle mounted device 1A determines whether or not there is any change in the target feature of detection (step S13). In this case, for example, the vehicle mounted device 1A determines whether or not there is a disappearance of the target feature or an alternation of the position or shape of the target feature by comparing the position and shape of the feature identified based on the output of the external sensor 31 and the present position which is predicted at step S11 to the position and shape of the feature indicated by the feature information stored on the storage unit 12. When the vehicle mounted device 1A determines that there is a change in the target feature of detection (step S13; Yes), the vehicle mounted device 1A generates and sends the difference information Idf to the server device 4 (step S14). In contrast, when the vehicle mounted device 1A determines that there is no change in the target feature of detection (step S13; No), the vehicle mounted device 1A goes back to the process at S11. In some embodiments, even when the vehicle mounted device 1A determines that there is no change in the target feature of detection, the vehicle mounted device 1A may send to the server device 4 information indicative of no change in the target feature of detection along with the feature ID of the target feature of detection. In this case, the difference information Idf is used for calculation of the degree of reliability Rdf, for example.

The server device 4 receives and stores the difference information Idf sent from vehicle mounted devices 1A of vehicles (step S21). Then, the server device 4 executes the process at following step S22 to step S27 with respect to each feature which is associated with the stored difference information Idf.

For a feature associated with the stored difference information Idf, the server device 4 determines whether or not the stored difference information Idf indicates the disappearance of the feature and the corresponding degree of reliability Rdf exceeds the first threshold (step S22). When the server device 4 determines that the stored difference information Idf indicates the disappearance of the feature and the corresponding degree of reliability Rdf exceeds the first threshold (step S22; Yes), the server device 4 determines that the difference information Idf is reliable and then updates the advanced map DB 43 (step S27). Specifically, in this case, the server device 4 deletes the feature information associated with the target feature from the advanced map DB 43 or adds information indicative of disappearance of the target feature to the feature information.

In contrast, when the stored difference information Idf indicates a change other than the disappearance or when the degree of reliability Rdf is equal to or lower than the first threshold (step S22; No), the server device 4 determines whether or not the raw data request condition is satisfied (step S23). For example, in such a case that the degree of reliability Rdf is lower than the second threshold, the server device 4 determines that the corresponding difference information Idf is unreliable, thus determining that the raw data request condition is not satisfied. In another example, incases that the stored difference information Idf indicates a change other than the disappearance and that the degree of reliability Rdf is equal to or higher than the second threshold, the server device 4 determines that the raw data request condition is satisfied. In still another example, in cases that the stored difference information Idf indicates the disappearance and that the degree of reliability Rdf is between the second threshold and the first threshold, the server device 4 determines that the raw data request condition is satisfied. In still another example, the server device 4 determines that the raw data request condition is satisfied if the number of the gathered difference information Idf is less than the required number for calculation of the degree of reliability Rdf.

When the server device 4 determines that the raw data request condition is satisfied (step S23; Yes), the server device 4 sends the raw data request signal SR in which the position of the target feature is specified to vehicle mounted device(s) 1B situated around the target feature (step S24). In contrast, when the server device 4 determines that the raw data request condition is not satisfied (step S23; No), the server device 4 goes to the process at step S21.

A vehicle mounted device 1B which is mounted on a vehicle on a road stores raw data, which is outputted from an external sensor 31 during a period in which the vehicle travels a predetermined distance, on the raw data cache 21 (step S31). Then, when the vehicle mounted device 1B receives the raw data request signal SR from the server device 4, the vehicle mounted device 1B stores information on the requested position to acquire the raw data indicated by the raw data request signal SR (step S32). In the case of the example illustrated in FIG. 5, as the information on the requested position to acquire the raw data, the vehicle mounted device 1B stores information registered in the field "POSITION INFORMATION" in the body information.

The vehicle mounted device 1B determines whether or not it is travelling around the requested position to acquire the raw data stored at step S32 (step S33). Then, when the vehicle mounted device 1B determines that it is travelling around the requested position to acquire the raw data (step S33; Yes), the vehicle mounted device 1B sends to the server device 4 the raw data information Irw that includes raw data which is stored on the raw data cache 21 and which satisfies the conditions registered in the field "RAW DATA TRANSMISSION CONDITIONS" in the body information of the raw data request signal SR (step S34). In contrast, when the vehicle mounted device 1B determines that it is not travelling around the requested position of the raw data stored at step S32 (step S33; No), the vehicle mounted device 1B goes back to the process at step S31 and ongoingly stores raw data generated by the external sensor 31 on the raw data cache 21.

In contrast, with respect to each feature associated with raw data request signals SR sent, the server device 4 determines whether or not the number of times of receiving the raw data information Irw is equal to or larger than a predetermined number (step S25). For example, the above predetermined number is determined to the number of the raw data information Irw necessary for feature detection through an image analysis and a statistic analysis on the raw data information Irw. When the server device 4 determines that the number of times of receiving the raw data information Irw is equal to or larger than the predetermined number (step S25; Yes), the server device 4 determines whether or not there is actually any change in the target feature by analyzing the detection of the feature based on the received raw data information Irw (step S26). In contrast, when the server device 4 determines that the number of times of receiving the raw data information Irw is smaller than the predetermined number (step S25; No), the server device 4 ongoingly receives the raw data information Irw.

When the server device 4 determines that there is actually any change in the target feature through the analyses by use of the raw data information Irw (step S26; Yes), the server device 4 updates the advanced map DB 43 based on the analysis result by use of the raw data information Irw (step 27). In contrast, when the server device 4 determines that there is actually no change in the target feature through the analyses by use of the raw data information Irw (step S26; No), the server device 4 terminates the flowchart.

As mentioned above, a server device 4 stores on a storage unit 42 an advanced map database 43 which includes feature information associated with a feature. The server device 4 receives, from vehicle mounted devices 1 equipped with external sensors 31 which measure features, difference information Idf indicative of a difference between feature information and the actual feature corresponding to the feature information. In accordance with the degree of reliability Rdf which is calculated based on a plurality of the difference information Idf, the server device 4 sends to the vehicle mounted device 1 a raw data request signal SR for requesting the transmission of raw data which is measurement data of the actual feature. According to this mode, for a feature in which there might be a change according to the difference information Idf, the server device 4 acquires and analyzes the raw data of the target feature from the vehicle mounted device 1 to thereby correctly determine the presence/absence of the change in the feature.

Here, a supramental explanation will be given of the effect of the update process of the advanced map DB 43 by use of gathered raw data information Irw.

Generally, since the difference information Idf sent by individual vehicle mounted devices 1A is information independently determined by each individual vehicle mounted device 1A, it could include data based on error detection. In response to the issue, the server device 4 according to the embodiment gathers and analyzes the difference information Idf generated at the same location by multiple vehicle mounted devices 1A. Thereby, the server device 4 can suitably calculate the degree of reliability Rdf corresponding to the difference information Idf. For example, in this case, the server device 4 updates the advanced map DB 43 in cases that the degree of reliability Rdf exceeds the first threshold that is an upper limit threshold whereas the server device 4 does not update the advanced map DB 43 in cases that the degree of reliability Rdf is lower than the second threshold that is a lower limit threshold. Then, the server device 4 sends the advanced map DB 43 updated in that way to each vehicle mounted device 1 again. Accordingly, the vehicle mounted device 1 can use the latest map data at any time.

In contrast, in places that the environment dynamically changes, such a situation could occur that whether the difference information Idf is reliable or unreliable cannot be concluded since the degree of reliability Rdf is between the second threshold and the first threshold. In such a situation, since raw data is measurement data into which the real world is captured without processing, the server device 4 gathers the raw data information Irw from each vehicle mounted device 1B, thereby determining the presence/absence of the change in the feature through a detailed analysis. Since the volume of raw data is generally huge, the server device 4 sends the raw data request signal SR, in which the location to acquire raw data is specified, to the vehicle mounted device 1B, thereby receiving the minimal raw data. Accordingly, it is possible to reduce the amount of the communication data.

[Modifications]

The server device 4 may put information for requesting raw data in the map data which is sent to each vehicle mounted device 1 instead of sending the raw data request signal SR.

FIG. 8A illustrates an example of the data structure of the feature information capable of including the information for requesting raw data.

According to the example illustrated in FIG. 8A, the field "ATTRIBUTE INFORMATION" is provided in the body information of the feature information while the subfield "DEGREE OF RELIABILITY" is provided in the field "ATTRIBUTE INFORMATION". In this case, for example, the server device 4 determines, as "Unknown", the subfield "DEGREE OF RELIABILITY" of the feature information corresponding to a feature whose raw data information Irw is required. In this case, a vehicle mounted device 1B, which receives the map data from the server device 4, determines that the reliability of the target feature is unknown and the vehicle mounted device 1B should send the raw data information Irw since "Unknown" is registered in the subfield "RELIABILITY" of the corresponding feature information which the vehicle mounted device 1B refers to. Accordingly, the vehicle mounted device 1B sends the raw data information Irw including the raw data stored on the raw data cache 21 to the server device 4 at the time of passing though the vicinity of the position indicated by the position information of the feature information.

In another example, a table in which a location to acquire the raw data can be specified may be defined as attribute information of road (line) information indicative of links and nodes. FIG. 8B illustrates an example of the data structure of the above table.

According to the example illustrated in FIG. 8B, the field "LINK ID/NODE ID" is provided in the header information and the corresponding link ID or node ID is registered therein. The fields "POSITION INFORMATION FORMAT INFORMATION", "SIZE INFORMATION", and a plurality of n fields "POSITION INFORMATION" are provided in the body information. In the field "POSITION INFORMATION FORMAT INFORMATION", identification information (e.g., longitude-latitude format or a position reference format) indicative of the format of the information registered in the field "POSITION INFORMATION" is registered. In the field "SIZE INFORMATION", the number (n herein) of the fields "POSITION INFORMATION" is registered. In each field "POSITION INFORMATION", the position information of the feature whose raw data is required or the position information indicative of the measurement position is registered.

In this case, the server device 4 adds the table illustrated in FIG. 8B as the attribute information to the road information and then sends the map data which includes the road information to the vehicle mounted device 1. The vehicle mounted device 1B which receives the table illustrated in FIG. 8B generates the raw data based on the position specified by the field "POSITION INFORMATION" in the body information to send the raw data information Irw which includes the generated raw data to the server device 4. It is noted that the server device 4 may sends the table illustrated in FIG. 8B as the raw data request signal SR to vehicle mounted device(s) 1A which travel on the target road or its nearby road(s) in the same way as the embodiment.

BRIEF DESCRIPTION OF REFERENCE NUMBERS

1 Vehicle mounted device
4 Server device
11, 41 Communication unit
12, 42 Storage unit
13 Sensor unit
14 Input unit
15, 45 Control unit
16 Output unit
31 External sensor
43 Advanced map DB

The invention claimed is:

1. An information processing device comprising:
a processor configured to
calculate a degree of reliability of difference information indicative of a difference between feature information associated with a feature and a real feature corresponding to the feature information, the difference information being provided by moving bodies which measure features; and
determine, on a basis of the degree of reliability, whether or not to request a moving body equipped with an external sensor to send raw data of the real feature to the information processing device, the raw data being generated by the external sensor.

2. The information processing device according to claim 1,
wherein a volume of the raw data is larger than a volume of the difference information.

3. The information processing device according to claim 1, the processor further configured to:
update the feature information in cases that the degree of the reliability exceeds an upper limit value while not updating the feature information in cases that the degree of the reliability is lower than a lower limit value, and
requests the moving bodies or another moving body to send the raw data in cases that the degree of the reliability does not exceed the upper limit value and equal to or higher than the lower limit value.

4. The information processing device according to claim 1, the processor further configured to:
request the moving bodies or another moving body to send the raw data in cases that the processor does not receive the difference information a number of times necessary to calculate the degree of the reliability during a predetermined period.

5. The information processing device according to claim 1, wherein the raw data is three-dimensional data generated by ranging device(s) which emit laser beams.

6. A measurement device mounted on a moving body, the measurement device comprising:
an external sensor configured to measure a position of an object situated around the moving body;
a processor configured to,
sequentially store raw data generated by the external sensor;
receive, from an external device which includes a storage device configured to store feature information associated with a feature, a transmission request including position information associated with the feature, wherein the transmission request is provided to the processor of the measurement device based on a degree of reliability of difference information indicative of a difference between the feature information associated with the feature and a real feature corresponding to the feature information; and
send to the external device the stored raw data in cases that a distance between a position of the moving body and a position indicated by the transmission request is equal to or shorter than a predetermined distance.

7. The measurement device according to claim 6,
wherein the raw data is updated in cases that the position of the moving body changes.

8. The measurement device according to claim 6,
wherein the processor is configured to store a plurality of the raw data corresponding to a plurality of different positions of the moving body and wherein in cases that the position of the moving body changes, the processor deletes longest-stored raw data out of the plurality of the raw data while storing raw data newly generated by the external sensor.

9. A control method executed by an information processing device equipped with a processor configured to store feature information associated with a feature, the control method comprising:
calculating a degree of reliability of difference information, provided from moving bodies equipped with measurement devices which measure features, wherein the difference information is indicative of a difference between the feature information and a real feature corresponding to the feature information; and
determining, on a basis of the degree of reliability, whether or not to request a moving body equipped with an external sensor to send raw data of the real feature to the information processing device, the raw data being generated by the external sensor.

10. A control method executed by a measurement device mounted on a moving body, the measurement device including an external sensor configured to measure a position of an object situated around the moving body; the control method comprising:
sequentially storing raw data generated by the external sensor;
receiving, from an external device which includes a storage device configured to store feature information associated with a feature, a transmission request including position information associated with the feature, wherein the transmission request is provided to the processor of the measurement device based on a degree of reliability of difference information indicative of a difference between the feature information associated with the feature and the real feature corresponding to the feature information; and
sending to the external device the stored raw data in cases that a distance between a position of the moving body and a position indicated by the transmission request is equal to or shorter than a predetermined distance.

* * * * *